(12) United States Patent
Otonari et al.

(10) Patent No.: US 9,397,923 B2
(45) Date of Patent: Jul. 19, 2016

(54) MOBILE COMMUNICATION TERMINAL TEST DEVICE AND MOBILE COMMUNICATION TERMINAL TEST METHOD

(71) Applicant: ANRITSU CORPORATION, Kanagawa (JP)

(72) Inventors: Nobutoshi Otonari, Kanagawa (JP); Kenichi Inoue, Kanagawa (JP); Hiroaki Iida, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 162 days.

(21) Appl. No.: 14/332,476

(22) Filed: Jul. 16, 2014

(65) Prior Publication Data

US 2015/0071094 A1 Mar. 12, 2015

(30) Foreign Application Priority Data

Sep. 9, 2013 (JP) ................. 2013-186117

(51) Int. Cl.
*H04L 12/28* (2006.01)
*H04W 4/00* (2009.01)
*H04L 12/26* (2006.01)

(52) U.S. Cl.
CPC .............. *H04L 43/50* (2013.01); *H04L 43/045* (2013.01)

(58) Field of Classification Search
CPC ..... H04L 1/0026; H04L 1/0029; H04L 5/001; H04L 5/0023
See application file for complete search history.

(56) References Cited

U.S. PATENT DOCUMENTS

| 9,019,847 B2 * | 4/2015 | Ko | H04L 1/0026 370/252 |
| 2011/0286412 A1 * | 11/2011 | Mochida | H04B 7/0452 370/329 |
| 2013/0003598 A1 * | 1/2013 | Tanaka | H04W 24/08 370/253 |
| 2013/0170418 A1 * | 7/2013 | Stauffer | H04W 52/0229 370/311 |
| 2013/0195067 A1 * | 8/2013 | Khoshnevis | H04L 5/0094 370/330 |
| 2014/0119333 A1 * | 5/2014 | Hedlund | H04W 72/1205 370/330 |

FOREIGN PATENT DOCUMENTS

JP 2013-012925 1/2013

* cited by examiner

*Primary Examiner* — Melanie Jagannathan
(74) *Attorney, Agent, or Firm* — Pearne & Gordon LLP

(57) ABSTRACT

A mobile communication terminal test device includes: test signal transmitting means (40) for transmitting, to a mobile communication terminal (50), a test signal including a plurality of radio resource regions (1 to 8) each of which is surrounded by one or more sub-frames and one or more resource blocks; and response signal receiving means (14) for receiving a response signal to the test signal from the mobile communication terminal. The test signal transmitting means transmits, to the mobile communication terminal, the test signal which includes one radio resource region for each predetermined time interval (T) and in which the position of the radio resource region in the frequency axis direction varies for each predetermined time interval.

14 Claims, 10 Drawing Sheets

| Position on time axis | Position on frequency axis |
|---|---|
| t1 | f1 |
| t2 | f2 |
| ⋮ | ⋮ |
| t8 | f8 |

FIG. 3

MOBILE COMMUNICATION TERMINAL TEST DEVICE AND MOBILE COMMUNICATION TERMINAL TEST METHOD

TECHNICAL FIELD

The present invention relates to a mobile communication terminal test device and a mobile communication terminal test method which test a mobile communication terminal such as a mobile phone or a mobile terminal.

BACKGROUND ART

In recent years, a transmission rate has increased and multimedia services, such as music and movie services, have been achieved by a mobile communication service. With the provision of the services, a communication frequency bandwidth has been broadened. For example, the maximum bandwidth is 5 MHz in a three-generation mobile communication system typified by a wideband-code division multiple access (W-CDMA) system, is 20 MHz in a long term evolution (LTE) system, and is 200 MHz in an LTE-Advanced system developed to further broaden the bandwidth and increase the transmission rate.

In the LTE system or the LTE-Advanced system, a modulation and coding scheme and the number of resource blocks are determined by the conditions of a transmission path and a packet transmission rate varies depending on the conditions of the transmission path. Therefore, a device which enables the tester to check the packet transmission rate has been proposed (for example, see Patent Document 1).

RELATED ART DOCUMENT

Patent Document

[Patent Document 1] Japanese Unexamined Patent Application Publication No. 2013-12925

DISCLOSURE OF THE INVENTION

Problem that the Invention is to Solve

However, when the above-mentioned broadband signal is used, a problem occurs in the frequency characteristics of the reception function of the mobile communication terminal which receives the broadband signal. Therefore, when developing the mobile communication terminal, it is important to evaluate the frequency characteristics of the reception function of the mobile communication terminal.

When a single component (for example, an amplifier) of a receiving unit which is incorporated into the mobile communication terminal is evaluated, it is possible to evaluate the frequency characteristics using a signal generator and a spectrum analyzer. However, it is difficult to evaluate the frequency characteristics of the reception function of the mobile communication terminal.

The invention has been made in view of the above-mentioned problems and an object of the invention is to provide a mobile communication terminal test device and a mobile communication terminal test method which can easily evaluate the frequency characteristics of the reception function of a mobile communication terminal.

Means for Solving the Problem

According to a first aspect of the invention, a mobile communication terminal test device includes: test signal transmitting means (40) for transmitting, to a mobile communication terminal (50), a test signal which is divided into sub-frames (SFs) in a time axis direction, is divided into resource blocks (RBs) in a frequency axis direction, and includes a plurality of radio resource regions (1 to 8) each of which is surrounded by one or more sub-frames and one or more resource blocks; and response signal receiving means (14) for receiving a response signal to the test signal from the mobile communication terminal. The test signal transmitting means transmits, to the mobile communication terminal, the test signal which includes one radio resource region for each predetermined time interval (T) and in which the position of the radio resource region in the frequency axis direction varies for each predetermined time interval.

According to this structure, in the mobile communication terminal test device according to the first aspect of the invention, since the test signal which includes one radio resource region for each predetermined time interval (T) and in which the position of the radio resource region in the frequency axis direction varies for each predetermined time interval is transmitted to the mobile communication terminal, it is possible to evaluate the frequency characteristics of the reception function of the mobile communication terminal.

According to a second aspect of the invention, the mobile communication terminal test device may further include: characteristic value conversion means (31) for converting a characteristic value of the response signal from a characteristic value corresponding to time to a characteristic value corresponding to a frequency, on the basis of correspondence information between a predetermined position of the radio resource region in the time axis direction and a predetermined position of the radio resource region in the frequency axis direction; and frequency characteristic display means (17) for displaying the characteristic value so as to correspond to the frequency.

According to this structure, the mobile communication terminal test device according to the second aspect of the invention includes the characteristic value conversion means for converting the characteristic value of the response signal from the characteristic value corresponding to the time to the characteristic value corresponding to the frequency, on the basis of the correspondence information between the predetermined position of the radio resource region in the time axis direction and the predetermined position of the radio resource region in the frequency axis direction and the frequency characteristic display means for displaying the characteristic value so as to correspond to the frequency. Therefore, it is possible to evaluate the frequency characteristics of the reception function of the mobile communication terminal.

According to a third aspect of the invention, in the mobile communication terminal test device, the characteristic value conversion means may convert the characteristic value of the response signal from the characteristic value corresponding to the time to the characteristic value corresponding to the frequency by replacing time corresponding to the characteristic value of the response signal with a frequency corresponding to the time, on the basis of the correspondence information between a predetermined time indicating the position of the radio resource region in the time axis direction and a predetermined frequency indicating the position of the radio resource region in the frequency axis direction.

According to this structure, in the mobile communication terminal test device according to the third aspect of the invention, it is possible to convert the characteristic value from the characteristic value corresponding to the time to the characteristic value corresponding to the frequency by replacing time corresponding to the characteristic value of the response signal with the frequency corresponding to the time.

According to a fourth aspect of the invention, the mobile communication terminal test device may further include average value acquisition means (32) for calculating an average value of the characteristic values corresponding to the frequencies. The test signal transmitting means may transmit, to the mobile communication terminal, a test signal in which the radio resource region groups are repeatedly arranged in the time axis direction. The frequency characteristic display means may display the average value of the characteristic values calculated by the average value acquisition means.

According to this structure, the mobile communication terminal test device according to the fourth aspect of the invention can relatively reduce a variation in characteristics at each frequency.

According to a fifth aspect of the invention, in the mobile communication terminal test device, the test signal may include a radio resource region group in which the radio resource regions are continuous in at least one of the time axis direction and the frequency axis direction.

According to this structure, the mobile communication terminal test device according to the fifth aspect of the invention can relatively reduce a variation in the measurement of the characteristic value of the response signal at each frequency.

According to a sixth aspect of the invention, in the mobile communication terminal test device, the test signal transmitting means may transmit, to the mobile communication terminal, the test signal including a radio resource region group which is set such that reference frequencies (f1 to f8) predetermined for the radio resource regions sequentially increase over time.

According to this structure, the mobile communication terminal test device according to the sixth aspect of the invention can evaluate the frequency characteristics of the reception function of the mobile communication terminal in the direction from a low frequency to a high frequency.

According to a seventh aspect of the invention, in the mobile communication terminal test device, the test signal transmitting means may transmit, to the mobile communication terminal, the test signal including a radio resource region group which is set such that reference frequencies (f1 to f8) predetermined for the radio resource regions sequentially decrease over time.

According to this structure, the mobile communication terminal test device according to the seventh aspect of the invention can evaluate the frequency characteristics of the reception function of the mobile communication terminal in the direction from a high frequency to a low frequency.

According to an eighth aspect of the invention, in the mobile communication terminal test device, the test signal transmitting means may transmit, to the mobile communication terminal, the test signal including a radio resource region group in which adjacent radio resource regions overlap each other in the frequency axis direction by a predetermined number of resource blocks.

According to this structure, the mobile communication terminal test device according to the eighth aspect of the invention can relatively reduce a variation in the measurement of the characteristic value of the response signal at each frequency.

According to a ninth aspect of the invention, a mobile communication terminal test method includes: a test signal transmitting step (S12) of transmitting, to a mobile communication terminal (50), a test signal which is divided into sub-frames (SFs) in a time axis direction, is divided into resource blocks (RBs) in a frequency axis direction, and includes a plurality of radio resource regions (1 to 8) each of which is surrounded by one or more sub-frames and one or more resource blocks; and a response signal receiving step (S13) of receiving a response signal to the test signal from the mobile communication terminal. The test signal transmitting step transmits, to the mobile communication terminal, the test signal which includes one radio resource region for each predetermined time interval (T) and in which the position of the radio resource region in the frequency axis direction varies for each predetermined time interval.

According to this structure, in the mobile communication terminal test method according to the ninth aspect of the invention, since the test signal which includes one radio resource region for each predetermined time interval (T) and in which the position of the radio resource region in the frequency axis direction varies for each predetermined time interval is transmitted to the mobile communication terminal, it is possible to evaluate the frequency characteristics of the reception function of the mobile communication terminal.

Advantage of the Invention

The invention can provide a mobile communication terminal test device and a mobile communication terminal test method which can easily evaluate the frequency characteristics of a reception function of a mobile communication terminal.

BRIEF DESCRIPTION OF THE DRAWINGS

FIG. 3 is a diagram illustrating time-frequency correspondence information in the mobile communication terminal test device according to the embodiment of the invention.

BEST MODE FOR CARRYING OUT THE INVENTION

Hereinafter, an embodiment of the invention will be described with reference to the drawings. An example in which a mobile communication terminal test device according to the invention tests a mobile communication terminal that performs communication on the basis of an LTE communication standard will be described.

First, the structure of a mobile communication terminal test device according to an embodiment of the invention will be described.

Figure 1:
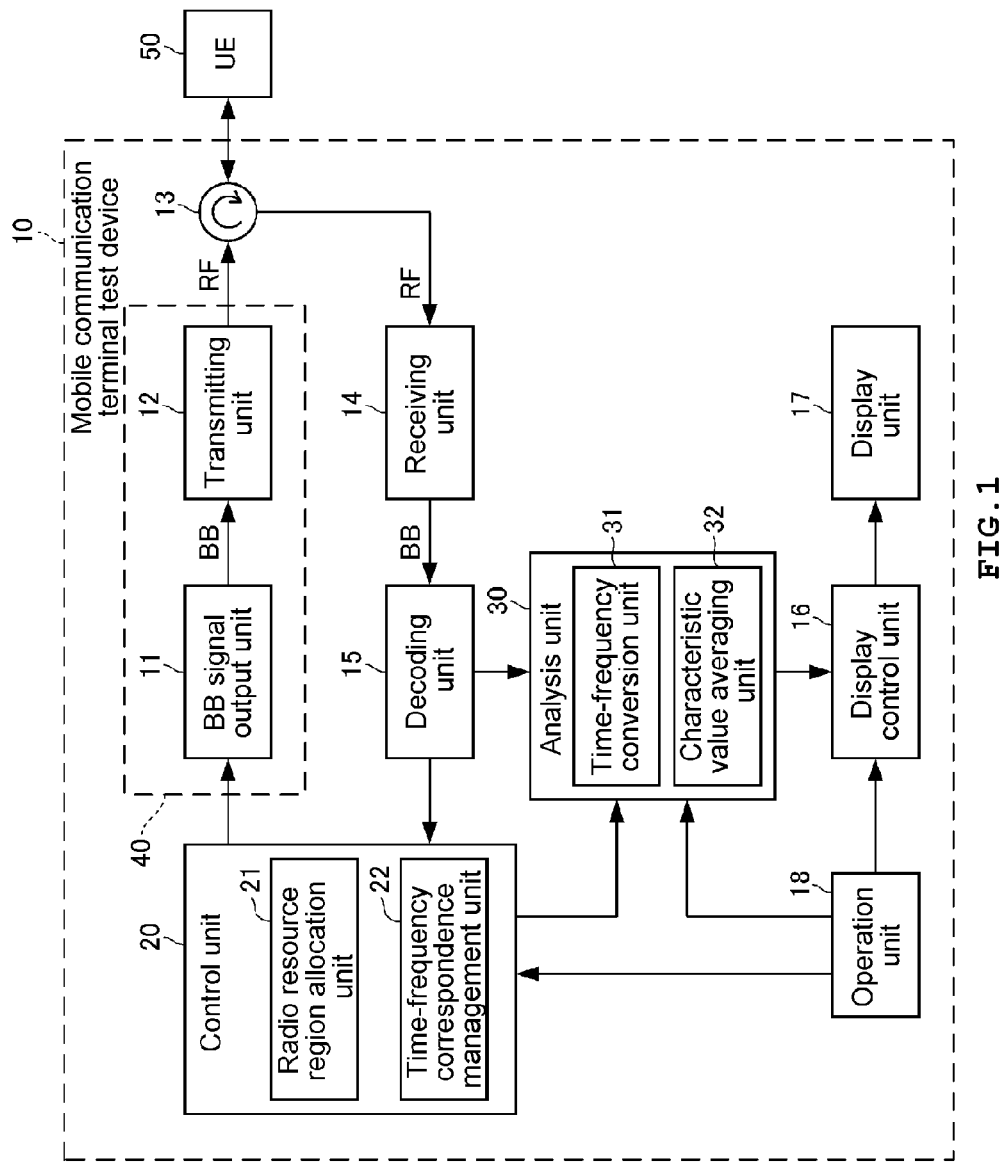
FIG. 1 is a block diagram illustrating a mobile communication terminal test device according to an embodiment of the invention.

As shown in FIG. 1, a mobile communication terminal test device 10 according to this embodiment includes a control unit 20, an analysis unit 30, a test signal transmitting unit 40, a circulator 13, a receiving unit 14, a decoding unit 15, a display control unit 16, a display unit 17, and an operation unit 18. The mobile communication terminal test device 10 tests a UE (mobile communication terminal) 50.

The control unit 20 includes a radio resource region allocation unit 21 which allocates a radio resource region and a time-frequency correspondence management unit 22 which manages time-frequency correspondence information indicating the correspondence relationship between the position of the radio resource region in a time axis direction and the position of the radio resource region in a frequency axis direction. In addition, the control unit 20 includes, for example, a CPU, a ROM, and a RAM and controls the overall operation of the device according to a program which is stored in the ROM in advance.

The radio resource region allocation unit 21 allocates the radio resource region for communication with the UE 50 on the basis of the time-frequency correspondence information managed by the time-frequency correspondence management unit 22. That is, in a case in which a BB signal output unit 11 generates baseband waveform data of a test signal and stores the baseband waveform data in advance, when the waveform data is generated, the control unit 20 controls the BB signal output unit 11 such that the waveform data to which the radio resource region is allocated on the basis of the time-frequency correspondence information stored in the time-frequency correspondence management unit 22 is generated. When the test signal is output, the control unit 20 controls the BB signal output unit 11 such that the waveform data corresponding to the time-frequency correspondence information is selected and output. When BB signal output unit 11 performs the processing of each transmission layer for the given test data to generate a baseband signal and outputs the generated baseband signal as in the actual base station, the control unit 20 controls the BB signal output unit 11 such that the radio resource region is allocated on the basis of the time-frequency correspondence information stored in the time-frequency correspondence management unit 22.

The time-frequency correspondence management unit 22 stores the time-frequency correspondence information indicating the correspondence relationship between the position of the radio resource region in the time axis direction and the position of the radio resource region in the frequency axis direction in advance and manages the time-frequency correspondence information. The tester operates the operation unit 18 to arbitrarily set the time-frequency correspondence information.

The test signal transmitting unit 40 includes the BB signal output unit 11 and a transmitting unit 12. The test signal transmitting unit 40 forms test signal transmitting means according to the invention.

The BB signal output unit 11 generates the baseband waveform data of the test signal in advance and stores the baseband waveform data of the test signal. In addition, the BB signal output unit 11 outputs the baseband waveform data of the test signal designated by the control unit 20 to the transmitting unit 12 in response to a control signal from the control unit 20. The BB signal output unit 11 may perform the processing of each transmission layer for the given test data to generate a baseband signal and may output the baseband signal to the transmitting unit 12, as in the actual base station.

The transmitting unit 12 performs D/A conversion, quadrature modulation, and frequency conversion for the baseband signal output from the BB signal output unit 11 and outputs the processed data as the test signal to the UE 50.

Next, the radio resource region included in the test signal transmitted by the transmitting unit 12 will be described with reference to FIG. 2.

Figure 2:
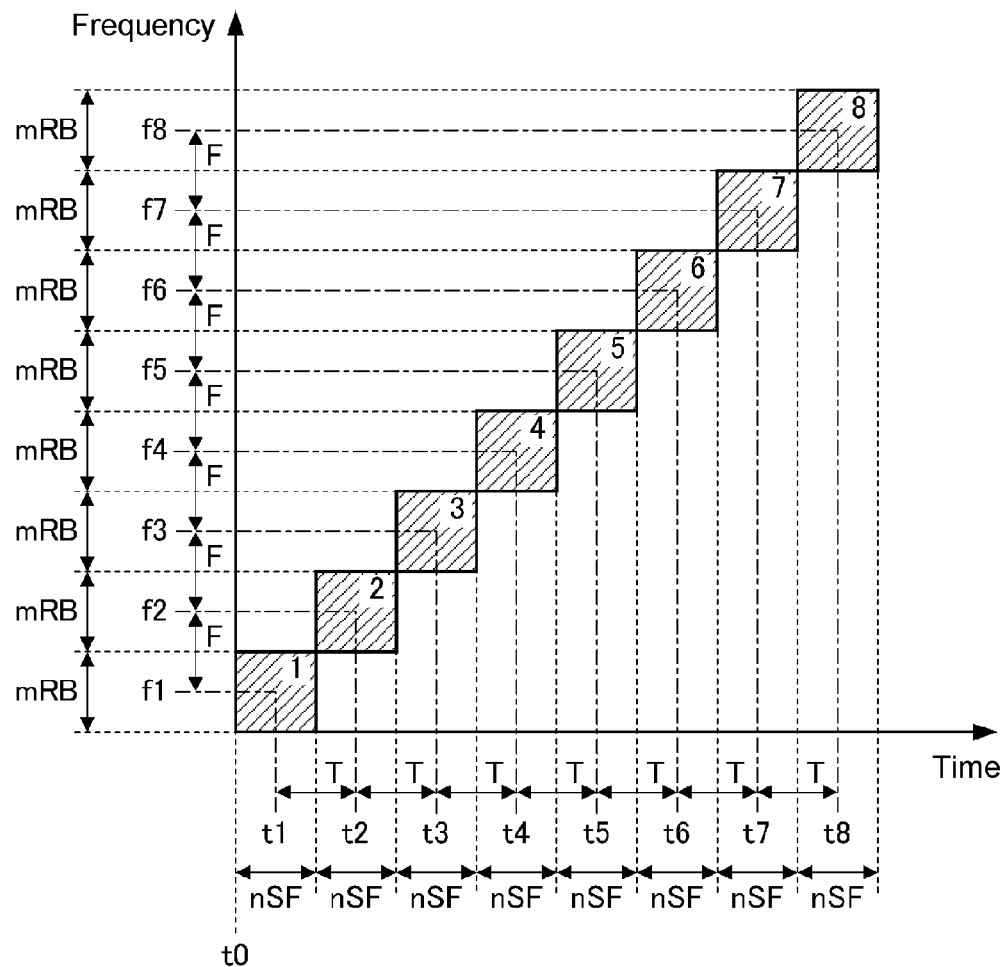
FIG. 2 is a diagram illustrating a radio resource region group which is used to transmit a test signal in the mobile communication terminal test device according to the embodiment of the invention.

As shown in FIG. 2, the test signal transmitted by the transmitting unit 12 includes at least one radio resource region group including eight radio resource regions 1 to 8. Each of the radio resource regions 1 to 8 includes n sub-frames (SFs) (n is an integer equal to or greater than 1) and m resource blocks (RBs) (m is an integer equal to or greater than 1). In the LTE communication standard, one sub-frame is 1 millisecond (msec) and one resource block is 180 kHz. FIG. 2 shows eight radio resource regions. However, the number of radio resource regions is an illustrative example. The number of radio resource regions may be two or more.

In this embodiment, the head position of the radio resource region 1 in the time axis direction is represented by a time t0 and the positions of the radio resource regions 1 to 8 in the time axis direction are represented by center times t1 to t8. The positions of the radio resource regions 1 to 8 in the frequency axis direction are represented by center frequencies f1 to f8. The center frequencies f1 to f8 correspond to a reference frequency according to the invention and sequentially increase over time. The time interval between the center times t1 to t8 is represented by T and the frequency interval between the center frequencies f1 to f8 is represented by F. The position of each of the radio resource regions 1 to 8 in the time axis direction is not limited to the center time and the position of each of the radio resource regions 1 to 8 in the frequency axis direction is not limited to the center frequency. For example, the position of each of the radio resource regions 1 to 8 may be represented by a time having the time t0 as a reference, instead of the center time.

As shown in FIG. 2, in the time axis direction, for example, the tail position of the radio resource region 1 is aligned with the head position of the radio resource region 2 and the tail position of the radio resource region 2 is aligned with the head position of the radio resource region 3. In the frequency axis direction, for example, the tail position of the radio resource region 1 is aligned with the head position of the radio resource region 2 and the tail position of the radio resource region 2 is aligned with the head position of the radio resource region 3.

That is, the transmitting unit 12 transmits a test signal having a radio resource region group in which adjacent radio resource regions are continuous in the time axis direction and the frequency axis direction. In other words, the transmitting unit 12 transmits a test signal having a radio resource region group in which the position of one radio resource region in the frequency axis direction is shifted at a frequency interval F for each predetermined time interval T.

Next, the time-frequency correspondence information managed by the time-frequency correspondence management unit 22 will be described with reference to FIG. 3.

As shown in FIG. 3, the time-frequency correspondence management unit 22 stores a table indicating the correspondence relationship between the positions of the radio resource regions 1 to 8 in the time axis direction and the positions of the radio resource regions 1 to 8 in the frequency axis direction. In the example shown in FIG. 3, the center times t1 to t8 of the radio resource regions 1 to 8 are associated with the center frequencies f1 to f8 of the radio resource regions 1 to 8, respectively. The tester operates the operation unit 18 to arbitrarily set the values in the table. When there are plural types of test signals, the time-frequency correspondence management unit 22 manages the time-frequency correspondence information for each test signal.

The mobile communication terminal test device 10 has the structure in which the BB signal output unit 11 outputs a baseband signal and the transmitting unit 12 performs frequency conversion and outputs a test signal. Therefore, when the control unit 20 controls the BB signal output unit 11 on the basis of the control time-frequency correspondence information, a difference in frequency caused by frequency conversion is considered. That is, the time-frequency correspondence management unit 22 stores baseband frequency information so as to be further associated with the time-frequency correspondence information shown in FIG. 3. Alternatively, the radio resource region allocation unit 21 controls the BB signal output unit 11 considering the difference in frequency.

The circulator 13 is connected to the UE 50 through a coaxial cable. When test data is transmitted, the circulator 13 receives an RF signal including the test signal from the transmitting unit 12 and transmits the RF signal to the UE 50. The circulator 13 receives an RF signal including a response signal to the test signal from the UE 50 and outputs the RF signal to the receiving unit 14. The response signal includes the characteristic value of the reception function of the UE 50. For example, the response signal includes characteristics, such as a reception level, reception quality, and throughput, as the characteristic value of the reception function of the UE 50.

The receiving unit 14 demodulates the RF signal received from the UE 50 and outputs a baseband signal including the response signal of the UE 50 to a decoding unit 15. The receiving unit 14 forms response signal receiving means according to the invention.

The decoding unit 15 receives the baseband signal including the response signal of the UE 50 from the receiving unit 14, decodes the baseband signal, and outputs the decoded baseband signal to the control unit 20 and the analysis unit 30.

The analysis unit 30 includes a time-frequency conversion unit 31 that converts the characteristic value of the response signal from time characteristics to frequency characteristics (that is, from a characteristic value corresponding to time to a characteristic value corresponding to a frequency) and a characteristic value averaging unit 32 that averages the characteristic values, and acquires characteristics, such as a reception level, reception quality, and throughput, included in the response signal. The time-frequency conversion unit 31 forms characteristic value conversion means according to the invention and the characteristic value averaging unit 32 forms average value acquisition means according to the invention.

Specifically, when the characteristic value of the reception level is a target, the analysis unit 30 acquires the frequency characteristics of reference signal received power (RSRP) included in the response signal. When the characteristic value of the reception quality is a target, the analysis unit 30 acquires the frequency characteristics of reference signal received quality (RSRQ) included in the response signal. In the acquisition of RSRP or RSRQ, when the duration of each of the radio resource regions 1 to 8 is, for example, 12 frames (=120 sub-frames), the UE 50 returns the response signal to the mobile communication terminal test device 10 for every 12 frames.

When the characteristic value of throughput is a target, the analysis unit 30 counts an acknowledgement (ACK) signal and a negative acknowledgement (NACK) signal included in the response signal, calculates the frequency characteristics of the throughput on the basis of the count values, and acquires the frequency characteristics of the throughput. The ACK signal indicates the success of reception and is transmitted when the UE 50 succeeds in receiving the signal transmitted to the UE 50. The NACK signal indicates the failure of reception and is transmitted when the UE 50 fails in receiving the signal transmitted to the UE 50. When the ACK signal and the NACK signal are acquired, for example, the UE 50 returns a response signal to the mobile communication terminal test device 10 for each sub-frame.

The time-frequency conversion unit 31 receives the time-frequency correspondence information from the time-frequency correspondence management unit 22 and converts the characteristic value of the response signal from time characteristics to frequency characteristics on the basis of the time-frequency correspondence information.

The characteristic value averaging unit 32 averages the characteristic values, which have been converted from the time characteristics to the frequency characteristics by the time-frequency conversion unit 31, if necessary.

Figure 4:
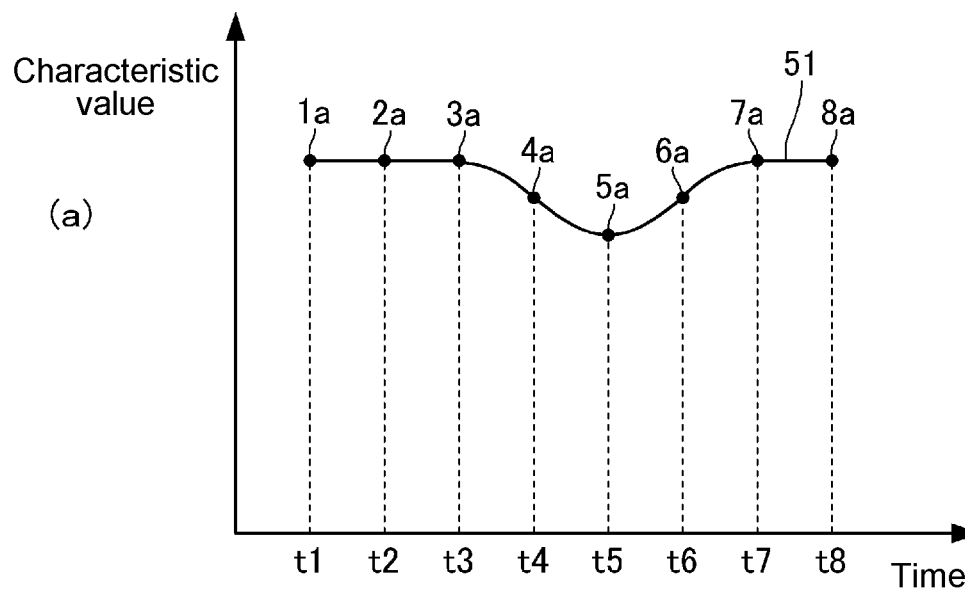
FIG. 4 is a conceptual diagram illustrating a process of converting a characteristic value from time characteristics to frequency characteristics in the mobile communication terminal test device according to the embodiment of the invention.
Figure 4:
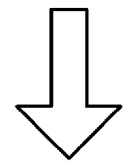
Figure 4:
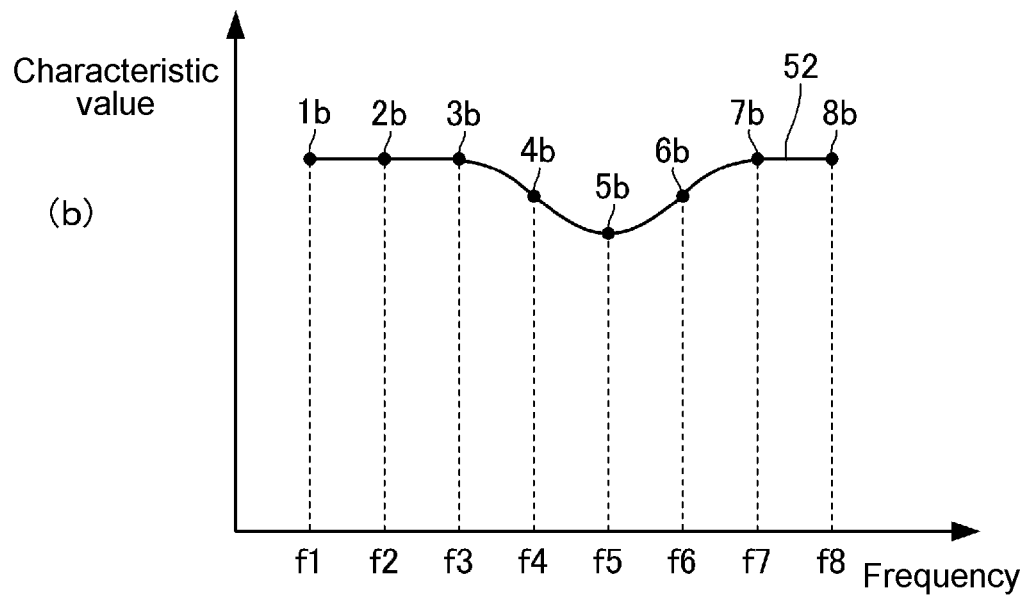

Next, the process of the time-frequency conversion unit 31 converting the characteristic value from the time characteristics to the frequency characteristics will be described with reference to the conceptual diagram shown in FIG. 4.

FIG. 4(a) shows an example of the response signal of the UE 50 which is input from the decoding unit 15 to the time-frequency conversion unit 31. The horizontal axis is the time axis and the vertical axis is the characteristic value. As shown in FIG. 2, the times t1 to t8 on the time axis indicate the positions of the radio resource regions 1 to 8 in the time axis direction. Characteristic values 1a to 8a corresponding to the times t1 to t8 are acquired. For example, the characteristic value 1a is the characteristic value of the radio resource region 1 and the characteristic value 2a is the characteristic value of the radio resource region 2. A graph 51 of the characteristic values corresponding to time is obtained by the characteristic values 1a to 8a. When the characteristic value is the reference signal received power, for example, the characteristic value 1a may be predetermined reference signal received power in the radio resource region 1 and all of the reference signal received power in the radio resource region 1 may be averaged.

The time-frequency conversion unit 31 receives the frequency correspondence information (see FIG. 3) from the time-frequency correspondence management unit 22 and recognizes that the times t1 to t8 correspond to the frequencies f1 to f8, respectively. Therefore, the time-frequency conversion unit 31 replaces the times t1 to t8 shown in FIG. 4(a) with the frequencies f1 to f8 and the analysis unit 30 obtains characteristic values 1b to 8b corresponding to the frequencies shown in FIG. 4(b). The characteristic values 1b to 8b form a frequency characteristic graph 52 and indicate the frequency characteristics of the reception function of the UE 50.

The display control unit 16 performs display control for displaying the frequency characteristic graph 52 on a screen of the display unit 17.

The display unit 17 displays the frequency characteristic graph 52 on the screen under the display control of the display control unit 16. The display unit 17 forms frequency characteristic display means according to the invention.

The operation unit 18 is operated by the tester includes an input device, such as a display, a keyboard, a dial, or a mouse, for setting, for example, the number of sub-frames and the number of resource blocks included in the radio resource region, a frequency bandwidth to be tested, and time-frequency correspondence information and a control circuit for controlling the input device.

Figure 5:
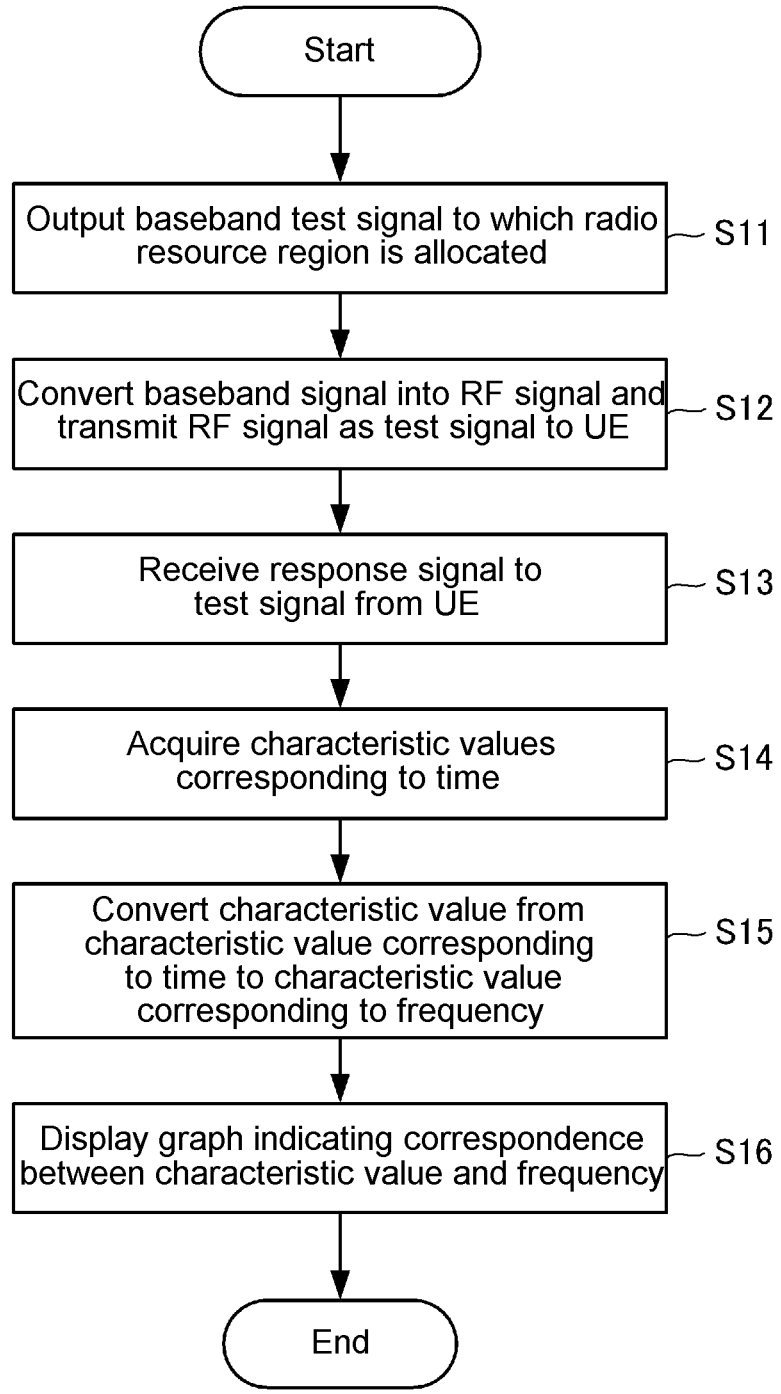
FIG. 5 is a flowchart illustrating the mobile communication terminal test device according to the embodiment of the invention.

Next, the operation of the mobile communication terminal test device 10 according to this embodiment will be described with reference to the flowchart shown in FIG. 5.

The BB signal output unit 11 outputs the baseband test signal which is designated by the control unit 20 and to which the radio resource region is allocated to the transmitting unit 12 in response to the control signal from the control unit 20 (Step S11).

The transmitting unit 12 performs D/A conversion, quadrature modulation, and frequency conversion for the baseband signal output from the BB signal output unit 11 and transmits the processed signal as a test signal to the UE 50 (Step S12).

The receiving unit 14 receives each response signal of the UE 50 to each test signal including the radio resource regions 1 to 8 from the UE 50 through the circulator 13 (Step S13). The receiving unit 14 converts the received signal into a baseband signal and the decoding unit 15 decodes the baseband signal.

The analysis unit 30 receives an output signal from the decoding unit 15 and acquires the characteristic values 1a to 8a (see FIG. 4(a)) corresponding to time (Step S14).

The time-frequency conversion unit 31 receives the time-frequency correspondence information from the time-frequency correspondence management unit 22 and replaces the times t1 to t8 shown in FIG. 4(a) with the frequencies f1 to f8, respectively, on the basis of the time-frequency correspondence information and converts the characteristic value corresponding to the time into the characteristic value corresponding to the frequency (Step S15). As a result, the analysis unit 30 obtains the characteristic values 1b to 8b (see FIG. 4(b)) indicating the frequency characteristics of the receiving unit 14. The characteristic value averaging unit 32 averages the characteristic values which are converted in correspondence with the frequencies, if necessary.

The display control unit 16 performs display control for displaying the characteristic values 1b to 8b acquired by the analysis unit 30 on the screen of the display unit 17 and the display unit 17 displays the graph 52 indicating the correspondence between the characteristic values 1b to 8b and the frequencies (Step S16).

As described above, the mobile communication terminal test device 10 according to this embodiment includes the time-frequency conversion unit 31 that converts the characteristic value of the response signal from the time characteristics to the frequency characteristics on the basis of correspondence information between the center times and the center frequencies which are predetermined for the radio resource regions 1 to 8 and the display unit 17 that displays the characteristic value of the frequency domain of the response signal. Therefore, it is possible to evaluate the frequency characteristics of the reception function of the UE 50.

In the above-described embodiment, the LTE communication standard is given as an example. However, the invention is not limited thereto. The invention may be applied to a communication standard which can transmit a test signal having a radio resource region including one or more sub-frames, which are predetermined time units, and one or more resource blocks, which are predetermined frequency band units, for example, an LTE-Advanced communication standard. In this case, it is possible to obtain the same effect as described above.

(Modification Example of Radio Resource Region Group)

Next, modification examples of the radio resource region group which is used by the transmitting unit 12 to transmit the test signal will be described with reference to FIGS. 6 to 10.

Figure 6:
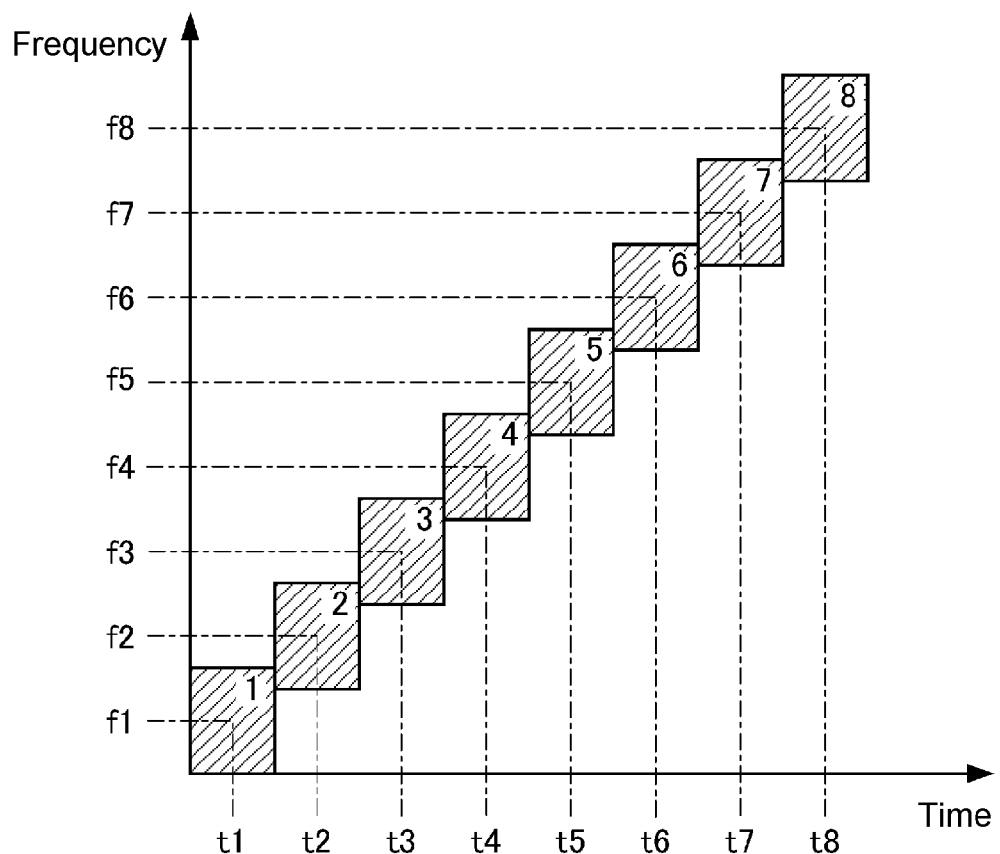
FIG. 6 is a diagram illustrating a first modification example of the radio resource region group which is used to transmit the test signal in the mobile communication terminal test device according to the embodiment of the invention.

In a first modification example of the radio resource region group, as shown in FIG. 6, adjacent radio resource regions are continuous in the time axis direction and are continuous in the frequency axis direction such that a predetermined number of resource blocks overlap each other. That is, the frequency bandwidth of each of radio resource regions 1 to 8 shown in FIG. 6 is wider than that shown in FIG. 2. When a test signal having the radio resource region group is transmitted, the frequency resolution of a response signal is relatively reduced, but a variation in the measurement of the characteristic value of the response signal at each frequency is relatively reduced. Therefore, it is preferable to set the frequency bandwidth of each radio resource region, considering whether emphasis is placed on the frequency resolution or the measure variation.

Figure 7:
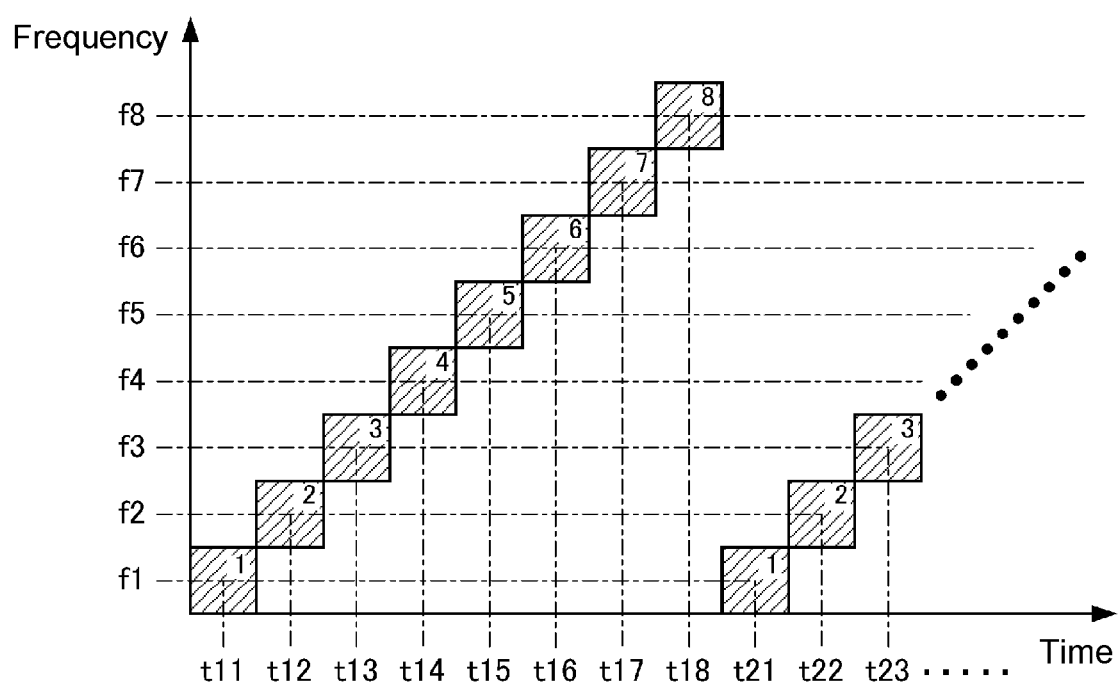
FIG. 7 is a diagram illustrating a second modification example of the radio resource region group which is used to transmit the test signal in the mobile communication terminal test device according to the embodiment of the invention.

In a second modification example of the radio resource region group, as shown in FIG. 7, radio resource region groups, each having radio resource regions 1 to 8, are repeated in the time axis direction. When a test signal having the radio resource region groups is transmitted, the characteristic value averaging unit 32 can average the characteristic values for each frequency and the analysis unit 30 acquires the characteristic values which are averaged for each frequency. Therefore, it is possible to relatively reduce a variation in characteristics at each frequency. Specifically, the characteristic value averaging unit 32 averages the characteristic value of the radio resource region at t11 and the characteristic value of the radio resource region at t21 and acquires the characteristic value of f1. Similarly, the averaging process is performed at t12 and t22, at t13 and t23, . . . .

Figure 8:
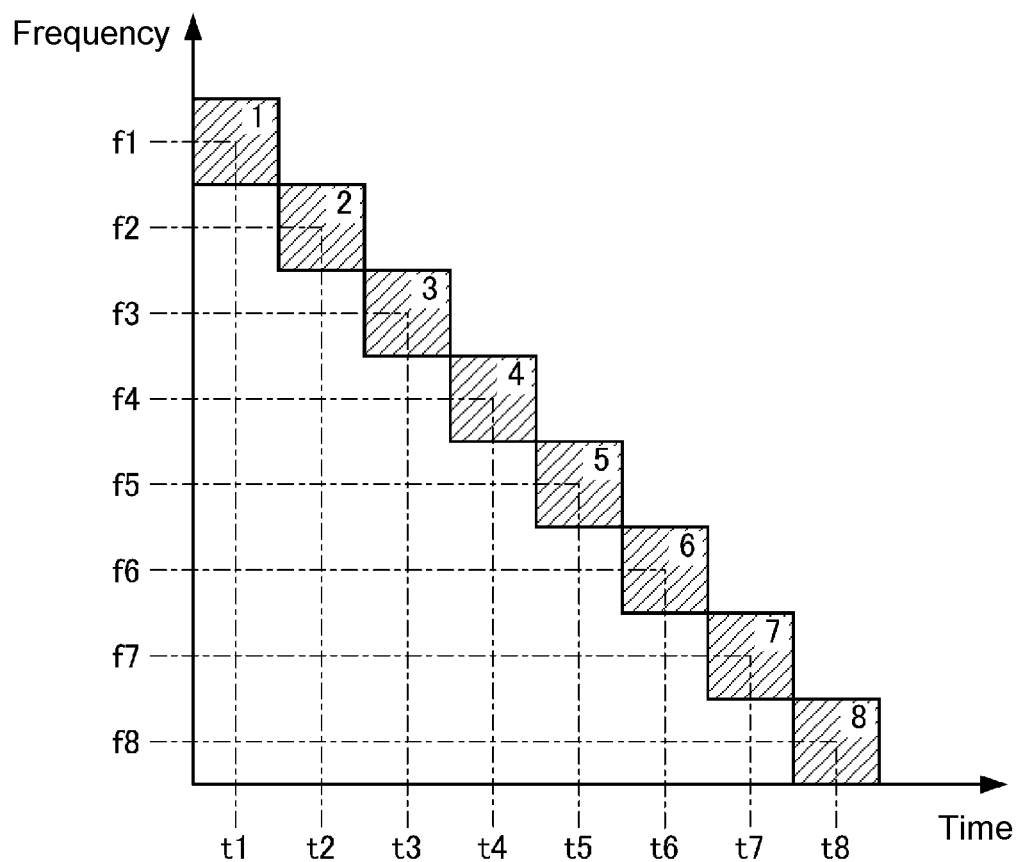
FIG. 8 is a diagram illustrating a third modification example of the radio resource region group which is used to transmit the test signal in the mobile communication terminal test device according to the embodiment of the invention.

In a third modification example of the radio resource region group, as shown in FIG. 8, the center frequencies f1 to f8 of the radio resource regions 1 to 8 are set to be sequentially reduced over time. When a test signal having the radio resource region group is transmitted, the same effect as that in the above-described embodiment (see FIG. 2) is obtained.

Figure 9:
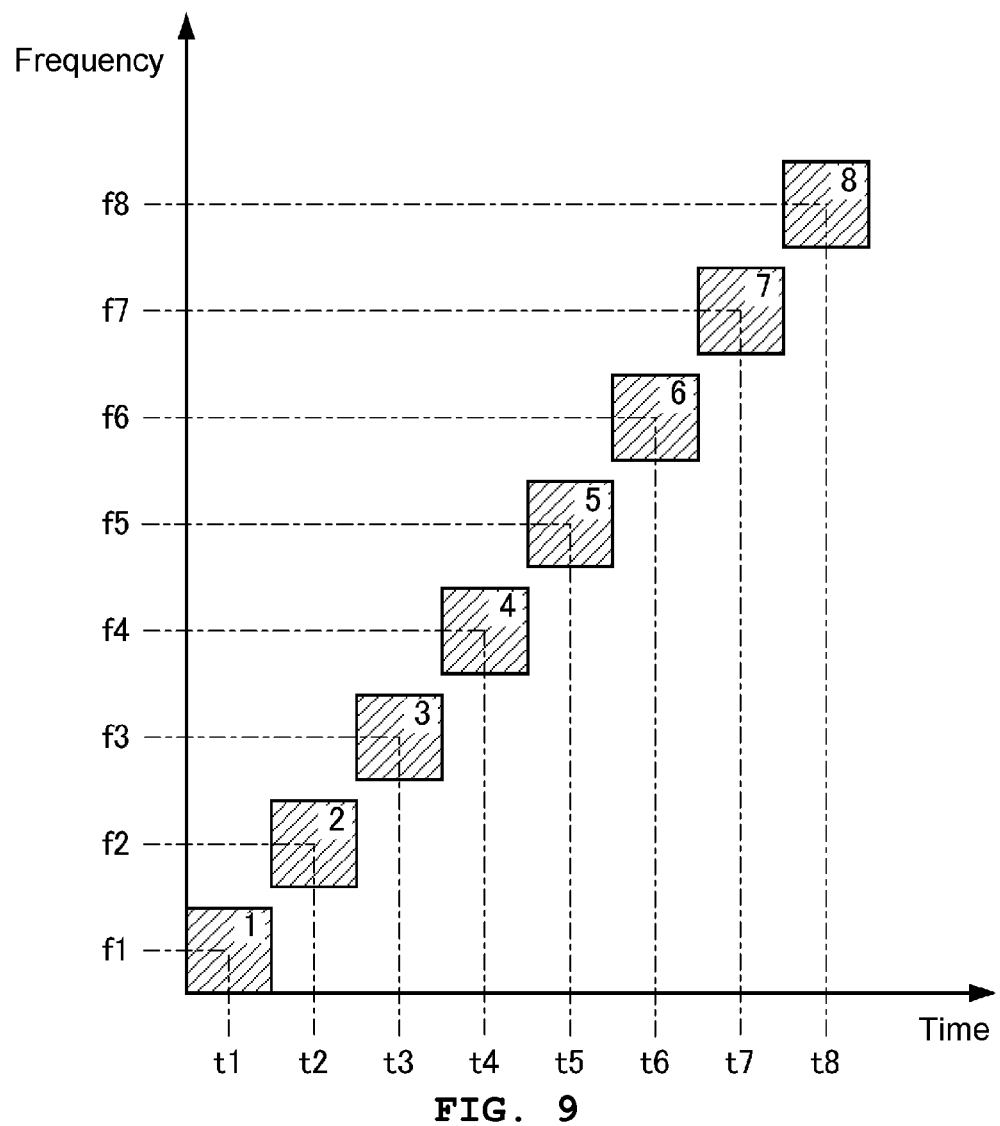
FIG. 9 is a diagram illustrating a fourth modification example of the radio resource region group which is used to transmit the test signal in the mobile communication terminal test device according to the embodiment of the invention.

In a fourth modification example of the radio resource region group, as shown in FIG. 9, adjacent radio resource regions are continuous in the time axis direction. The adjacent radio resource regions are not continuous in the frequency axis direction and are separated by a predetermined number of resource blocks. When a test signal having the radio resource region group is transmitted, the same effect as that in the above-described embodiment (see FIG. 2) is obtained.

Figure 10:
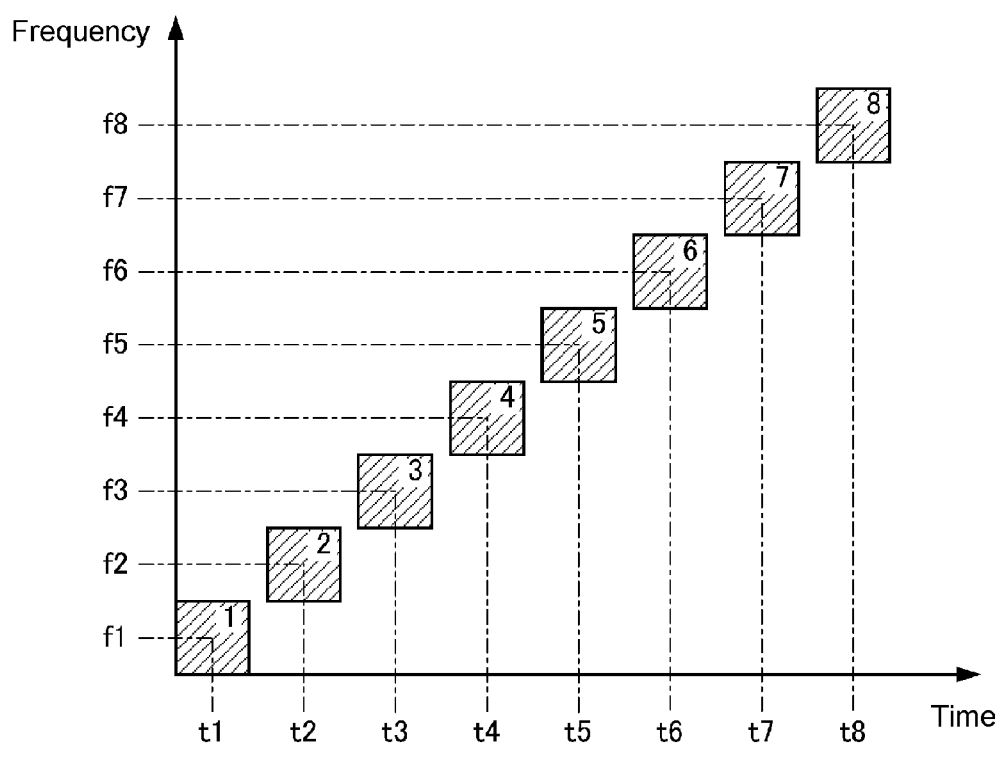
FIG. 10 is a diagram illustrating a fifth modification example of the radio resource region group which is used to transmit the test signal in the mobile communication terminal test device according to the embodiment of the invention.

In a fifth modification example of the radio resource region group, as shown in FIG. 10, adjacent radio resource regions are continuous in the frequency axis direction. The adjacent radio resource regions are not continuous in the time axis direction and are separated by a predetermined number of sub-frames. When a test signal having the radio resource region group is used, the same effect as that in the above-described embodiment (see FIG. 2) is obtained.

These modification examples may be combined with each other, if necessary.

INDUSTRIAL APPLICABILITY

As described above, the mobile communication terminal test device and the mobile communication terminal test method according to the invention can evaluate the frequency characteristics of the reception function of the mobile communication terminal and are useful as a mobile communication terminal test device and a mobile communication terminal test method which test a mobile communication terminal, such as a mobile phone or a mobile terminal.

DESCRIPTION OF REFERENCE NUMERALS AND SIGNS

1 TO 8: RADIO RESOURCE REGION
10: MOBILE COMMUNICATION TERMINAL TEST DEVICE
11: BB SIGNAL OUTPUT UNIT
12: TRANSMITTING UNIT (TEST SIGNAL TRANSMITTING MEANS)
13: CIRCULATOR
14: RECEIVING UNIT (RESPONSE SIGNAL RECEIVING MEANS)
15: DECODING UNIT
16: DISPLAY CONTROL UNIT
17: DISPLAY UNIT (FREQUENCY CHARACTERISTIC DISPLAY MEANS)
18: OPERATION UNIT
20: CONTROL UNIT
21: RADIO RESOURCE REGION ALLOCATION UNIT
22: TIME-FREQUENCY CORRESPONDENCE MANAGEMENT UNIT
30: ANALYSIS UNIT
31: TIME-FREQUENCY CONVERSION UNIT (CHARACTERISTIC VALUE CONVERSION MEANS)
32: CHARACTERISTIC VALUE AVERAGING UNIT (AVERAGE VALUE ACQUISITION MEANS)
40: TEST SIGNAL TRANSMITTING UNIT (TEST SIGNAL TRANSMITTING MEANS)
50: UE (MOBILE COMMUNICATION TERMINAL)

What is claimed is:

1. A mobile communication terminal test device comprising:
test signal transmitting means for transmitting, to a mobile communication terminal, a test signal which is divided into sub-frames in a time axis direction, is divided into resource blocks in a frequency axis direction, and includes a plurality of radio resource regions each of which is surrounded by one or more sub-frames and one or more resource blocks;
response signal receiving means for receiving a response signal to the test signal from the mobile communication terminal;
characteristic value conversion means for converting a characteristic value of the response signal from a characteristic value corresponding to time to a characteristic value corresponding to a frequency, on the basis of correspondence information between a predetermined position of one radio resource region in the time axis direction and a predetermined position of the radio resource region in the frequency axis direction; and
frequency characteristic display means for displaying the characteristic value so as to correspond to the frequency,
wherein the test signal transmitting means transmits, to the mobile communication terminal, the test signal which includes the radio resource region for each predetermined time interval and in which the position of the radio resource region in the frequency axis direction varies for each predetermined time interval.

2. The mobile communication terminal test device according to claim 1,
wherein the characteristic value conversion means converts the characteristic value of the response signal from the characteristic value corresponding to the time to the characteristic value corresponding to the frequency by replacing time corresponding to the characteristic value of the response signal with a frequency corresponding to the time, on the basis of the correspondence information between a predetermined time indicating the position of the radio resource region in the time axis direction and a predetermined frequency indicating the position of the radio resource region in the frequency axis direction.

3. The mobile communication terminal test device according to claim 1, further comprising:
average value acquisition means for calculating an average value of the characteristic values corresponding to the frequencies,
wherein the test signal transmitting means transmits, to the mobile communication terminal, a test signal in which the radio resource region groups are repeatedly arranged in the time axis direction, and
the frequency characteristic display means displays the average value of the characteristic values calculated by the average value acquisition means.

4. The mobile communication terminal test device according to claim 1,
wherein the test signal includes a radio resource region group in which the radio resource regions are continuous in at least one of the time axis direction and the frequency axis direction.

5. The mobile communication terminal test device according to claim 1,
wherein the test signal transmitting means transmits, to the mobile communication terminal, the test signal including a radio resource region group which is set such that reference frequencies predetermined for the radio resource regions sequentially increase over time.

6. The mobile communication terminal test device according to claim 1,
wherein the test signal transmitting means transmits, to the mobile communication terminal, the test signal including a radio resource region group which is set such that reference frequencies predetermined for the radio resource regions sequentially decrease over time.

7. A mobile communication terminal test device comprising:
test signal transmitting means for transmitting, to a mobile communication terminal, a test signal which is divided into sub-frames in a time axis direction, is divided into resource blocks in a frequency axis direction, and includes a plurality of radio resource regions each of which is surrounded by one or more sub-frames and one or more resource blocks; and
response signal receiving means for receiving a response signal to the test signal from the mobile communication terminal,
wherein the test signal transmitting means transmits, to the mobile communication terminal, the test signal which includes:
one radio resource region for each predetermined time interval and in which the position of the radio resource region in the frequency axis direction varies for each predetermined time interval, and
a radio resource region group in which adjacent radio resource regions overlap each other in the frequency axis direction by a predetermined number of resource blocks.

8. A mobile communication terminal test method comprising:

a test signal transmitting step of transmitting, to a mobile communication terminal, a test signal which is divided into sub-frames in a time axis direction, is divided into resource blocks in a frequency axis direction, and includes a plurality of radio resource regions each of which is surrounded by one or more sub-frames and one or more resource blocks;

a response signal receiving step of receiving a response signal to the test signal from the mobile communication terminal;

a characteristic value conversion step of converting a characteristic value of the response signal from a characteristic value corresponding to time to a characteristic value corresponding to a frequency, on the basis of correspondence information between a predetermined position of one radio resource region in the time axis direction and a predetermined position of the radio resource region in the frequency axis direction; and a frequency characteristic display step of displaying the characteristic value so as to correspond to the frequency, wherein the test signal transmitting step transmits, to the mobile communication terminal, the test signal which includes the radio resource region for each predetermined time interval and in which the position of the radio resource region in the frequency axis direction varies for each predetermined time interval.

9. The mobile communication terminal test method according to claim 8, wherein the characteristic value conversion step converts the characteristic value of the response signal from the characteristic value corresponding to the time to the characteristic value corresponding to the frequency by replacing time corresponding to the characteristic value of the response signal with a frequency corresponding to the time, on the basis of the correspondence information between a predetermined time indicating the position of the radio resource region in the time axis direction and a predetermined frequency indicating the position of the radio resource region in the frequency axis direction.

10. The mobile communication terminal test method according to claim 8, further comprising:

an average value acquisition step of calculating an average value of the characteristic values corresponding to the frequencies, wherein the test signal transmitting step transmits, to the mobile communication terminal, a test signal in which the radio resource region groups are repeatedly arranged in the time axis direction, and the frequency characteristic display step displays the average value of the characteristic values calculated in the average value acquisition step.

11. The mobile communication terminal test method according to claim 8, wherein the test signal includes a radio resource region group in which the radio resource regions are continuous in at least one of the time axis direction and the frequency axis direction.

12. The mobile communication terminal test method according to claim 8, wherein the test signal transmitting step transmits, to the mobile communication terminal, the test signal including a radio resource region group which is set such that reference frequencies predetermined for the radio resource regions sequentially increase over time.

13. The mobile communication terminal test method according to claim 8, wherein the test signal transmitting step transmits, to the mobile communication terminal, the test signal including a radio resource region group which is set such that reference frequencies predetermined for the radio resource regions sequentially decrease over time.

14. A mobile communication terminal test method comprising:

a test signal transmitting step of transmitting, to a mobile communication terminal, a test signal which is divided into sub-frames in a time axis direction, is divided into resource blocks in a frequency axis direction, and includes a plurality of radio resource regions each of which is surrounded by one or more sub-frames and one or more resource blocks; and a response signal receiving step of receiving a response signal to the test signal from the mobile communication terminal, wherein the test signal transmitting step transmits, to the mobile communication terminal, the test signal which includes:

one radio resource region for each predetermined time interval and in which the position of the radio resource region in the frequency axis direction varies for each predetermined time interval, and a radio resource region group in which adjacent radio resource regions overlap each other in the frequency axis direction by a predetermined number of resource blocks.

* * * * *